(12) United States Patent
Hartman et al.

(10) Patent No.: US 7,345,743 B1
(45) Date of Patent: Mar. 18, 2008

(54) WIDE ANGLE LASER RANGE AND BEARING FINDER

(75) Inventors: Richard L. Hartman, Huntsville, AL (US); Michael K. Balch, Madison, AL (US); Stephen R. Granade, Madison, AL (US)

(73) Assignee: Advanced Optical Systems, Huntsville, AL (US)

( * ) Notice: Subject to any disclaimer, the term of this patent is extended or adjusted under 35 U.S.C. 154(b) by 0 days.

(21) Appl. No.: 11/386,253

(22) Filed: Mar. 21, 2006

Related U.S. Application Data

(60) Provisional application No. 60/664,374, filed on Mar. 21, 2005.

(51) Int. Cl.
*G01C 3/08* (2006.01)
(52) U.S. Cl. ..................................... 356/4.01
(58) Field of Classification Search ................ 356/4.01
See application file for complete search history.

(56) References Cited

U.S. PATENT DOCUMENTS

2004/0233416 A1* 11/2004 Doemens et al. .......... 356/5.01

* cited by examiner

*Primary Examiner*—Thomas H. Tarcza
*Assistant Examiner*—Luke D. Ratcliffe
(74) *Attorney, Agent, or Firm*—Mark Clodfelter

(57) ABSTRACT

A range and bearing-finding system is disclosed. A diverging encoded laser beam is transmitted to a target, and a return reflection of the encoded beam received. The transmitted beam is sampled, and a plurality of predetermined time delays are applied to the sampled laser beam. The sampled laser beam with each of the predetermined time delays is correlated with the return reflection until a sampled laser beam having a time delay providing the highest correlation is found, the time delay indicating laser travel time to and from the target. Range is determined from this time delay. Bearing of the target is found by using a quadrant protector to receive the return reflection. The process for finding bearing uses the correlation process used to find range.

23 Claims, 8 Drawing Sheets

WIDE ANGLE LASER RANGE AND BEARING FINDER

CROSS REFERENCE TO RELATED APPLICATIONS

This Application claims the benefit of provisional application No. 60/664,374, filed Mar. 21, 2005.

FIELD OF THE INVENTION

This invention relates to laser range and bearing finding devices for determining range and bearing with respect to 2 spacecraft vehicles, and particularly to a laser range and bearing finder having a relatively wide field of view and which will simultaneously determine range to and bearing of a target at intermediate ranges of from about 5 km down to about 10 meters or so.

BACKGROUND OF THE INVENTION

At the present time, there is an increasing need for autonomous rendezvous and docking capabilities of unmanned spacecraft vehicles in order to decrease mission cost and reduce risk to human life. For instance, planned space missions call for unmanned spacecraft to take samples from other planets and planetoids and return them to earth. With respect to other unmanned missions for support for other spacecraft, support spacecraft are required to reliably "home in" and dock with another spacecraft in order for them to carry out their designed functions. At the same time, a trend is underway to assemble spacecraft and support structures in orbit to avoid requirements for heavy-lift vehicles where large payloads are required. In addition, satellite support, such as support necessary for the Hubble space telescope, may be accomplished using unmanned autonomous spacecraft, thus significantly lowering cost of maintaining satellites.

Development of autonomous rendezvous and docking sensors currently in progress include the Video Guidance Sensor and the Advanced Video Guidance Sensor, both of which are being developed at NASA's Marshall Space Flight Center in Huntsville, Ala. These systems work by illuminating with laser light several retro-reflector targets mounted to a target vehicle, optically imaging the reflected light, and processing the resultant pattern of light to determine range, bearing, and pose, or relative orientation, and provide six-degree-of-freedom information. Six degree of freedom information refers to elevation, azimuth, range, roll, pitch and yaw. Laser wavelength frequencies used in this system are 808 nm and 845 nm, with sensors on a tracking spacecraft receiving returned laser light. Here, the sensor is a camera, with processing performed on camera images to extract range and pose information. This system has a working range of roughly 500 m. NASA is currently committed to using these video guidance systems. As such, any other laser range and bearing finding system used in conjunction with the Video Guidance Sensor and Advanced Video Guidance Sensor would need to be designed so as not to interfere with these video guidance systems.

Another system is under development by OPTECH Inc., Toronto, Canada, and MD ROBOTICS, Brampton, Ontario, Canada, and is known as the RENDEZVOUS LASER VISION system. This system uses a scanning LIDAR to track spacecraft at ranges of 3.5 km, and determines pose by matching a measured 3D image to models.

As far as the Applicants are aware, relative GPS/ground based radar systems are not sufficient to allow spacecraft to dock, and do not support lunar missions.

In addition to the foregoing, systems designed for use in space need to be as simple as possible due to the harsh environment. As such, stationary systems (strap-down sensor systems) are preferable to scanning systems that require moving components. Applicants are aware of scanning laser radar systems that use a small spot of laser light to generate high return signals, but in space such systems require precise pointing of the laser, and acquisition of a target would require that the beam be scanned back and forth over a region of space where the target is expected. Such scanning requires moving parts that increase complexity, expanse and failure expectations of the system.

To these ends, Applicants propose a combined laser range and bearing finder that operates at an intermediate range out to about 5 kilometers down to about 10 meters or so, and which has a relatively wide field of view so as to allow it to operate as a strapdown sensor. It may operate as either a standalone sensor, or operate in tandem with other sensor systems that return range, bearing and orientation information at close ranges, such as the aforementioned Advanced Video Guidance Sensor.

DETAILED DESCRIPTION OF THE DRAWINGS

In general, Applicants system operates by emitting at least one diverging pulsed laser beam at a target spacecraft, and analyzing electrical signals representative of received laser reflections from the target spacecraft. The emitted laser beam is directly sampled by a photodetector as it is emitted to provide a timing reference and to capture light intensity profiles of the emitted laser pulses. Reflected laser light from the target spacecraft is captured by a quadrant detector that converts the reflected laser light from the target spacecraft into analog electrical signals. These electrical signals are then digitized and processed to extract both range and bearing information. As such, system complexity is reduced by using a single laser transmission system and single light receiving system to ascertain both range and bearing. In addition, enhanced range accuracy is provided by using a correlation process in conjunction with direct sampling of the emitted laser pulses.

A number of advantages are thus evident in Applicants system. For instance, a field of view of the emitted laser beam may be made as wide or narrow as necessary by selecting the appropriate laser, laser power, lens system and processing scheme. This allows the system to be used as a strapdown sensor without the complexities inherent in a scanning apparatus or a gimbaled system. Further, and as stated, a direct sample measurement of emitted light, as implemented in Applicants system, improves correlation results.

Significantly, correlation processing used in Applicants system boosts a signal-to-noise ratio a great deal over threshold-detection and peak-detection schemes known in the prior art, since correlation processing uses shape and duration of each pulse rather than just the amplitude of the pulse. While short pulses are generally used to prevent cross-talk between a laser emitter and photoreceptor and to provide for good range resolution, longer pulses may be used where a simpler design is desired. Also, pulse encoding wherein intervals between the pulses, and in some instances the pulse width, may be made variable by generating pulse intervals using a pseudo-random code. In other embodiments, a Barker-type code may be used, the Barker-type and pseudo-random codes selected to provide a greatest correlation enhancement of signal-to-noise ratio. As such, a plurality of laser range and bearing finders in use in one general region in space or on earth may each use unique transmitted codes so as to prevent interference with one another.

Figure 1:
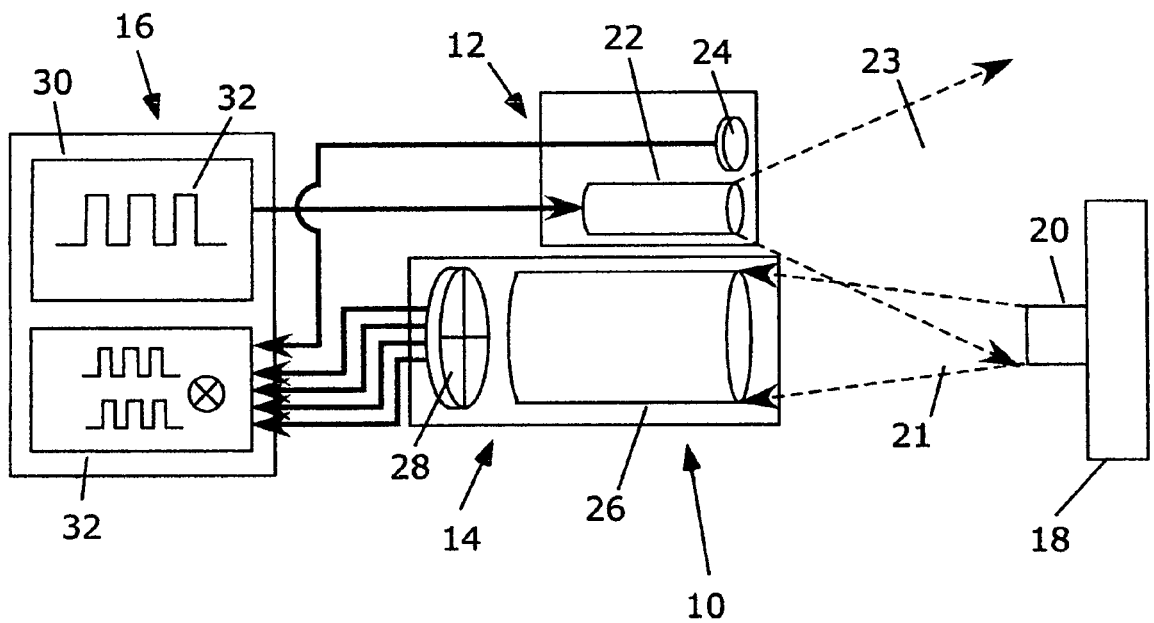
FIG. 1 is a partially schematic, partially block diagram of one embodiment of the system of the present invention.

Referring initially to FIG. 1, a partially block, partially schematic diagram illustrates the instant invention on an overall level. Here, laser rangefinder and bearing detector 10 comprises a laser transmitter assembly 12, and a laser detector assembly 14. Assemblies 12 and 14 are electrically coupled to a signal processor assembly 16 that may be partially in the form of software and partially in the form of firmware. As noted above, rangefinder and bearing detector assembly 10 may be mounted to one spacecraft, with a second spacecraft 18 provided with one or more cooperative targets 20, which may be optical retro-reflectors such as corner cube prisms. Of course, other types of reflectors and reflective materials may be used, such as standard reflectors or diffuse-scattering reflectors.

Laser tracking assembly 12 is constructed having a laser transmitter or emitter 22, and which transmits a laser beam of a wavelength selected so as to not interfere with the aforementioned Video Guidance Sensor (VGS) or the Advanced Video Guidance Sensor (AVGS). Where Applicants system is used in conjunction with the VGS and AVGS systems, a transmitted wavelength from laser transmitter 22 may be on the order of about 940 nm, this wavelength also having the additional advantage of being relatively safe with respect to human eyes. Of course, other laser wavelengths may be used in Applicants system where appropriate. In one contemplated embodiment, and by way of example only, a plurality of laser emitters may be used simultaneously, each emitter providing about 2 watts of emitted power. Such a plurality of laser emitters may be used to increase the range of the system. The beam of light from transmitter 22 may be optically converted into a relatively wide-angle cone 23, which may be on the order of 5 degrees or so as opposed to a tiny spot for a conventional collimated laser beam. While diverging the laser beam into a cone of light decreases power of reflected light from a target, using correlation processing greatly increases a signal-to-noise ratio of the resultant signal. As noted above, one or more reflectors suitable for this purpose may also be mounted to the target, or the target may be coated with a reflective coating that will reflect the small amounts of power resulting from the diverging laser beam back to a receiver. While a cone having a divergence of about 5 degrees is disclosed, it should be apparent that the laser emitter and photoreceiver may be modified to produce a wider or narrower field of view as desired. For instance, where a greater range is desired, a narrower field of view, or more powerful laser emitters may be used.

Figure 1A:
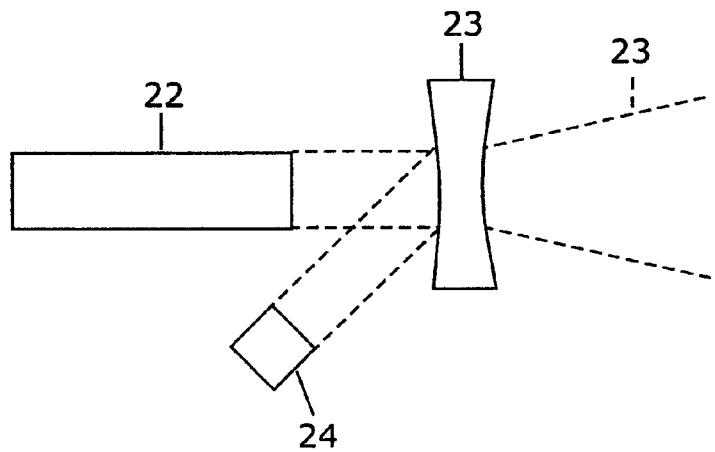
FIG. 1*a* is a diagrammatic view showing construction details of FIG. 1

As shown in FIG. 1a, and as one feature of construction of the present invention, laser emitter 22 may be spaced a small distance from a lens or lens system 23 that produces divergence of the laser beam, with a photodetector 24 for sampling the emitted laser light positioned to receive a specular reflection of the laser beam from the emitter 22 side of lens 23. No particular reflective coating is needed on lens 23 to develop this reflection as glass from which lenses are fabricated in general is naturally slightly reflective. However, in some instances, a slightly reflective coating may be used to reflect a larger portion of light to photodetector 24. In other embodiments, sampling may be effected by positioning a small mirror in the beam, the use of an additional beamsplitter, or may be incorporated directly in lens 23. In this latter instance, a photodetector 24 may be mounted on an edge of a lens that is configured to be edge-lit by laser light passing through the lens. In any case, photodetector 24 is positioned to sample a portion of light emitted by laser transmitter 22 in order to provide a direct indication of the emitted light. Such sampling provides a more accurate temporal reference with respect to timing of the emitted laser pulse, takes into account any inherent variations between respective laser emitters and provides a light intensity profile of the laser pulses. While a laser transmitter 22 may be one or more diode lasers as described above, a gas laser, solid-state laser or any other lasing device suitable for Applicants purposes may be employed. Also, photodetector 24 may provide an analog electrical signal, or may be incorporated in an integrated assembly that provides a digital signal indicative of the emitted laser pulse sequences.

Figure 3:
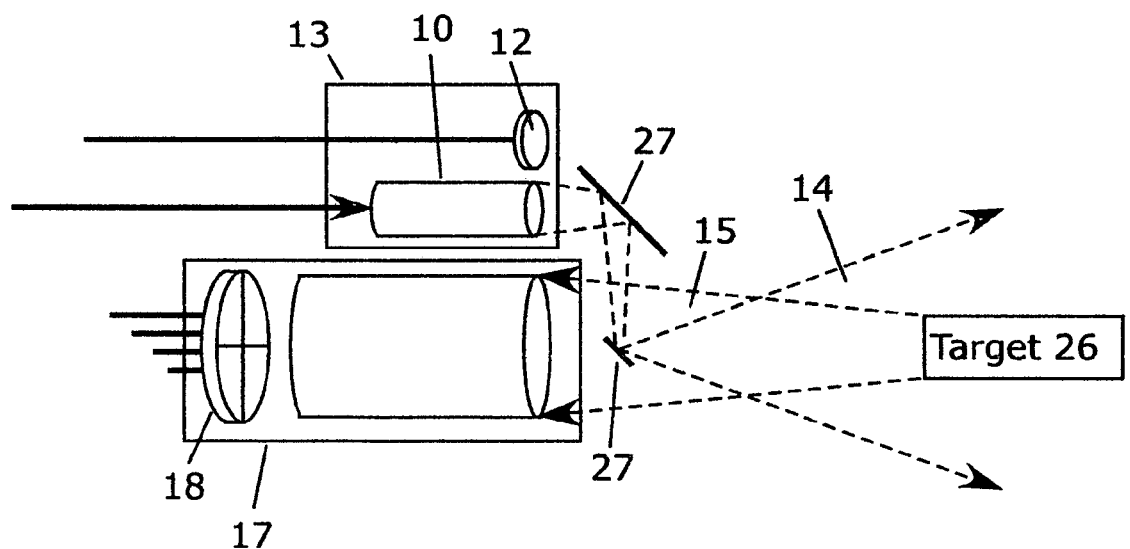
FIG. 3 is another embodiment showing an optical configuration of the present invention.

For receiving a return reflection of the emitted laser pulse sequences, laser detector assembly 14 is constructed including a matched optical receiver 26 and a quadrant detector 28. As shown, receiver 26 is mounted closely adjacent to laser emitter 22 in a bistatic design, although as shown in FIG. 3, mirrors 27 may be positioned to implement a monostatic design wherein the emitted laser light is coaxial with the sensor optics. This allows the collection of more light from a perfect retroreflecting target. Alternately, the laser diodes may be constructed in a compact package positioned coaxially with respect to optical receiver 26. In this instance, the laser beam may be passed through some or all of the lenses in the receiving optics in order to coaxially emit and diverge the laser beam. Here, the laser emitter may be centrally located in a small cavity and the appropriate lens of a lens system used to receive the laser beam. Where the lens system is a compound lens system, the cavity may be in a particular lens and of an appropriate depth therein to optically diverge the beam. The lasers may be powered either by an electrically transmissive coating on an adjacent lens, a layer of transparent electrically transmissive material or by tiny wires in small grooves in one of the lenses, the wires potted within the groove with an appropriate material that may be transparent and have a refractive index closely matching that of the material from which the lenses are made.

Optical receiver 26 includes a lens system having a field of view that generally may match the optical angle of the diverging laser beam cone so as to receive some of the reflected light 21 from reflector 20. Quadrant detector 26 may be a conventional quadrant detector, such as a quadrant detector part number SPOT-9DMI manufactured by OSI OPTOELECTRONICS, INC. located in Hawthorne, Calif.

Light collected by matched optical receiver 26 is focused onto quadrant detector 28, which in turn generates 4 discrete electrical signals, one for each quadrant of the detector. Each of the 4 signals is proportional to the amount of light that falls upon a respective quadrant of quadrant detector 28. Constructed as such, light emitted by laser emitter 22 is used for both range and bearing determinations. Where only range information is needed, a single suitable photodetector may be substituted for the quadrant detector. In this instance, separate detectors and a lens array may be used wherein each detector is provided with its own discrete lens. While a matched optical receiver is disclosed for collecting light, any optical system for developing a blur spot on quadrant detector 28 may be used in conjunction with Applicants system.

Light emitted from laser emitter 22 is pulsed in accordance with programming of an output signal generator 30 located in signal processor 16. Signal generator 30 provides a stream of pulses 32 that are amplified and used to energize laser emitter 22, which in turn develops a corresponding stream of laser pulses. As noted, pulses 32 may be configured as a pseudo-random code wherein about 30-40 pulses or so are generated in a pulse train, with at least pulse spacing, and possibly pulse width, being unique within a particular selected pulse train. Alternately, Barker-type code sequences or the like may be used, at least some of these sequences also providing a high signal-to-noise ratio. Clearly then, the system may be configured to emit any laser signal that provides a clearly distinguishable reflection from the target object or reflector.

In general, laser range finding operates by transmitting a short laser pulse and receiving a reflected return from the pulse, with a delay between transmission of the pulse and reception of the pulse indicative of time of travel of the laser beam to and from the target. This delay is divided by half and multiplied by the speed of light, thus allowing distance from the laser transmitter to the target to be determined. As such, individual laser pulses need to be kept very short, on the order of 200 microseconds or so, with an entire pulse train sequence generally being approximately 4 to 5 milliseconds or so. These pulse trains may be transmitted at intervals to determine range and bearing at these intervals, or where tracking is desired, the pulse trains may be transmitted continuously. In some instances, the same pulse train, while pseudorandom or a Barker-type code with respect to itself, may be used repeatedly. In other instances, different sequences per pulse train may be used. In yet other instances, in environmental conditions such dusty or extreme lighting conditions; the system may be configured to try different pulse sequences until a sequence is found that provides a highest signal-to-noise ratio. Sampling of the pulse train is accomplished as described by photodetector 24 in order to accurately determine time of transmission and shape of the emitted laser pulses.

Figure 2:
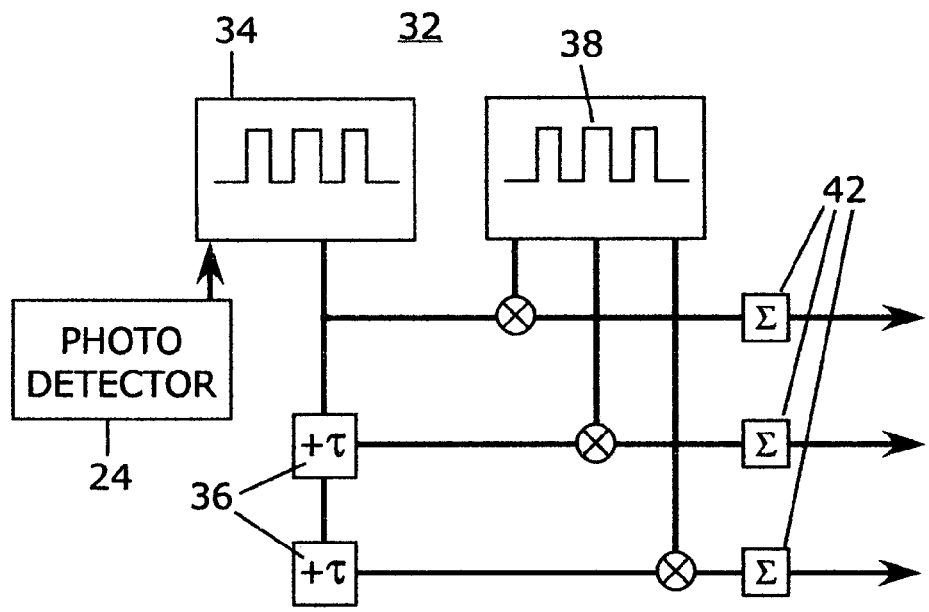
FIG. 2 is a block diagram of a signal-processing scheme of the present invention.

In order to determine range to the target, a correlation process is used. Referring to FIG. 2, a correlation processor 32 correlates return or reflected light 21 from a target 18 (FIG. 1) with the sampled signals from photodetector 24. As shown in FIG. 2, the sampled pulse train 34 from photodetector 24 is duplicated, and each copy delayed by selected periods of time, as indicated by time delay boxes 36. Each delayed signal from time delay boxes 36 is multiplied by the return or reflected pulse train 38 at a respective multiplication box 40, and summed at respective boxes 42. This results in a single correlation number for each of the time-delayed sample signals from boxes 36, with the highest number indicative of a time delay with the best correlation. While only three such correlation processes are shown for brevity, many such correlations would typically be undertaken depending on degree of accuracy or resolution required.

For determining bearing of a target, signal processor 32 correlates each separate quadrant signal from quadrant detector 28. As the pulses are transmitted, the return pulses are received and light falling on each quadrant is sampled and correlated with at least 1 time shifted version of the transmitted sample. It is to be understood that in Applicants system a plurality of such time-shifted transmission samples, such as 88, are performed simultaneously, as will be further explained.

Each of these 88 correlations result in a single correlation peak for each quadrant. Next, the correlation peaks the from the left 2 quadrants are added together, and the correlation peaks from the right 2 quadrants are added together. A subtraction operation is performed and the results normalized to determine horizontal direction of the target. Likewise, a similar process is performed between the top 2 quadrants and the bottom 2 quadrants to determine vertical direction to the target. Together with range, the vertical and horizontal directions to the target compose a guidance data output.

Figure 4:
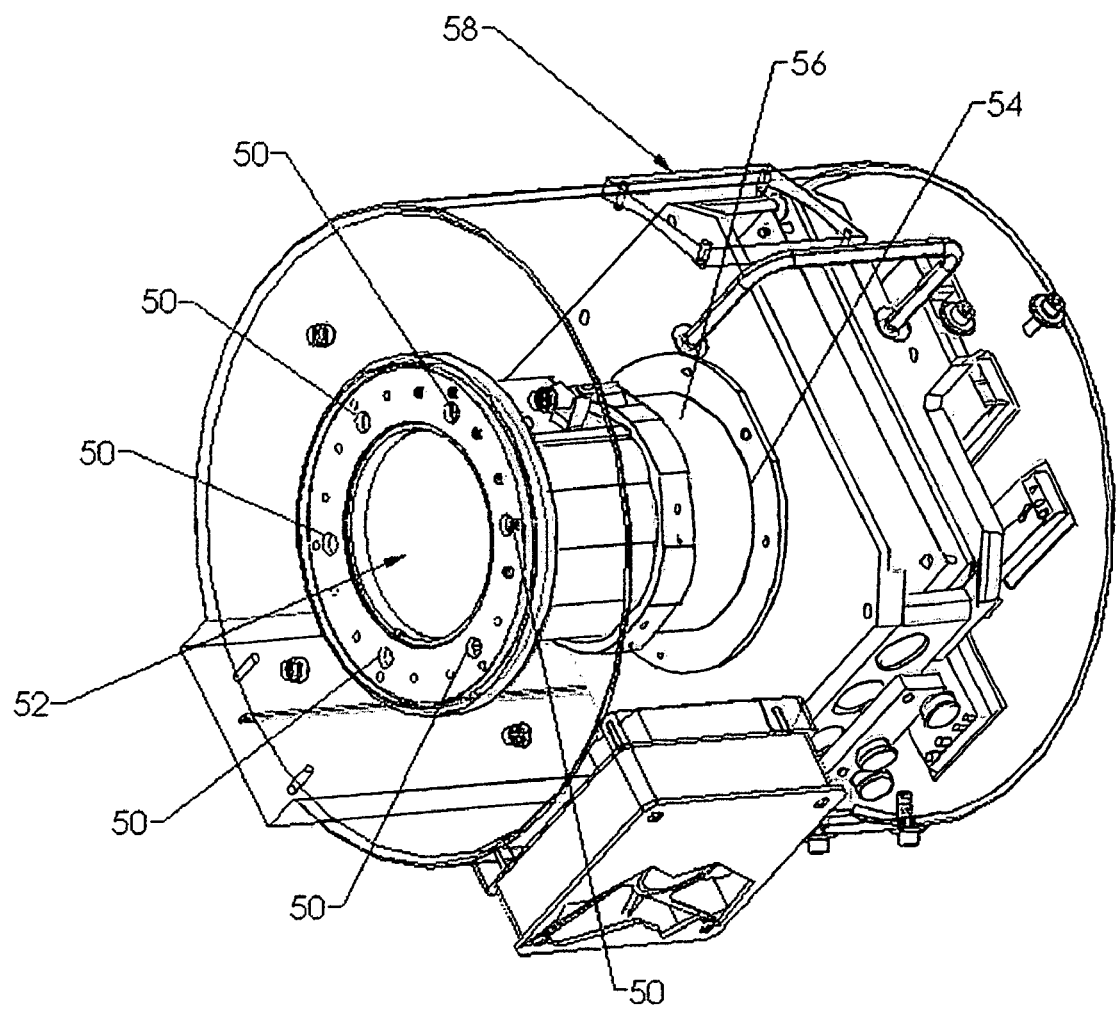
FIG. 4 is an engineering view of one embodiment of the present invention.

FIG. 4 illustrates, by way of example, one implementation contemplated by Applicants of a bistatic design for a laser range/bearing finder. Here, six laser diode emitters 50 surround light collection optics 52, with a quadrant detector (not shown) mounted at a rear region 54 of tubular member 56 through which light from the light collection optics passes. As noted above, each laser diode is energized to provide about 2 watts of power. The light collection optics 52 is generally a telescopic system. By way of example only, the objective lens may be about 4 inches or so in diameter, with the entire lens system being a compound lens system that imperfectly focuses a received image into a blur circle about the diameter of the quadrant detector, which is about 1 inch in diameter. An interference filter may be included in the lens system for generally blocking extraneous light, such as sunlight, and which may be further configured as a narrow pass filter for passing a narrow band of selected wavelengths associated with the laser transmitters. The choice of laser diodes in this application is driven by electrical efficiency, although as stated, other types of lasers may be used where conservation of electrical power is less of a design consideration. Only 3 of the laser diodes are energized at a time, this amount of light being sufficient to provide a range of about 5 kilometers or so.

The other three laser diodes provide redundancy for the system. In some embodiments wherein the laser range and bearing finder is used on manned equipment, a mount 58 for an optical sighting device, such as a telescopic sight, may be provided to initially sight and align a target.

In Applicants system, slight variations in rise and fall times of the intensity profiles of the discrete lasers may be taken into account by a calibration procedure wherein energizing pulses applied to each laser may be adjusted in accordance with measured characteristics of each laser. Another method for compensating for intensity variations may be to sample transmitted light from all the transmitting lasers and add the samples together, and compare the total sampled light with total received sampled light.

For compensating or calibrating the system for electronic delay and propagation delays with integrated electronic devices, calibration simply includes transmitting one or more laser beams to a target at a known distance and measuring the propagation and other electronic delays.

Figure 5:
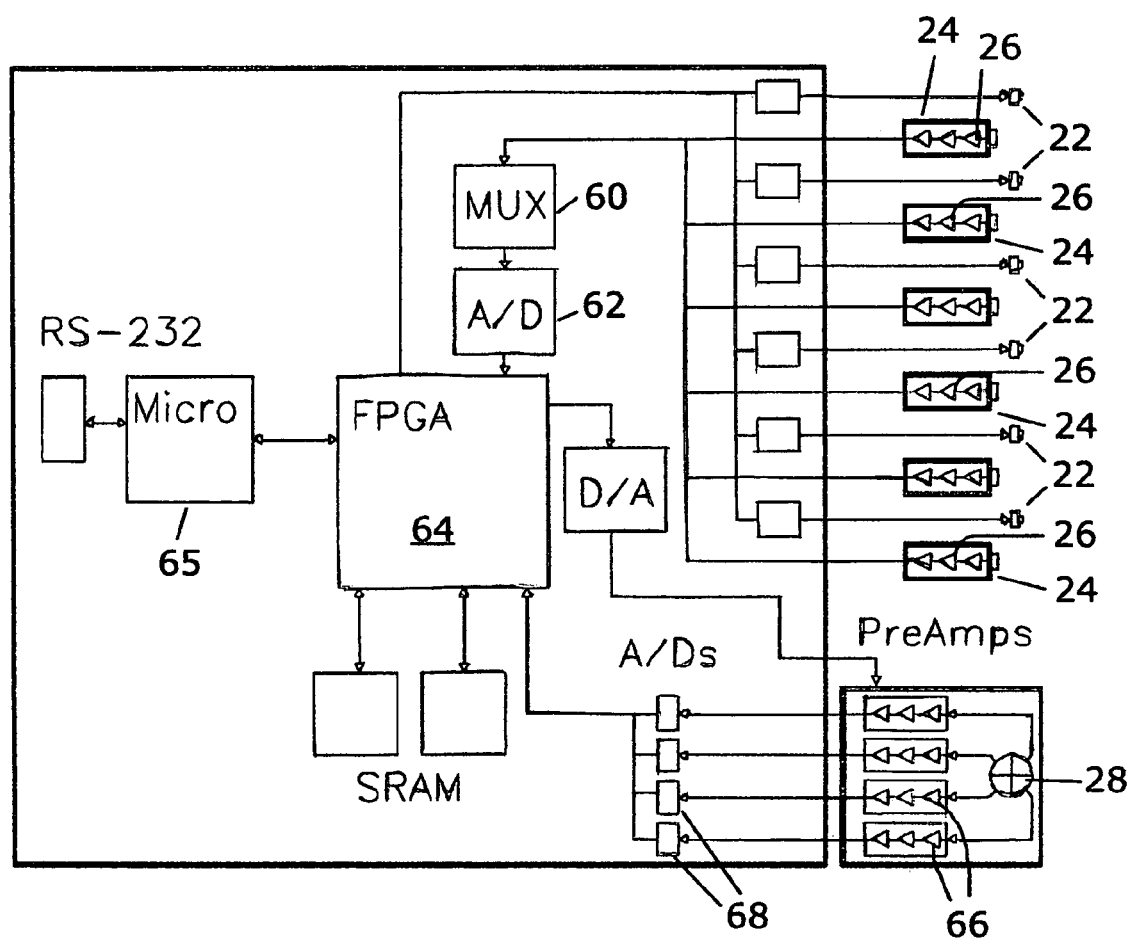
FIG. 5 is an electrical block diagram of control circuitry of the present invention

FIG. 5 illustrates, by way of example, a block diagram of one embodiment of electronics of the present invention. The system may be electrically powered in its intended operation by batteries, solar power, nuclear reaction devices, chemical reaction devices or any other power supply as should be evident to one skilled in the relevant arts. As shown, 6 laser diode emitters 22 are provided, with sampling photodiode collectors 24 mounted to sample light emitted by a respective laser diode. As stated, only 3 of the laser diodes may be energized at a time. An electrical signal representative of sampled light is received by each of photodetectors 24, and passed to multiplexer 60, which in turn passes one of the sampled laser signals to A/D converter 62. The particular one of samples from photodetectors 24 may be arbitrary, or may be based on criteria such as which photodetector provides a highest amplitude of the three transmitting lasers.

A/D converter 62 may be 8 bits wide, and configured to operate at a sampling rate of 40 MHz or so, a rate at which the entire system is conventionally clocked. The particular sampling rate and bandwidth of the A/D converter is not critical so long as the sampling rate and bandwidth is sufficient for it to accomplish its intended purpose. The digitized signal from A/D converter 62 is applied to a field programmable gate array (FPGA) 64 programmed as will be further described. Typically, operational functions are distributed between the FPGA and software associated with microprocessor 65, the FPGA program with set, repetitive functions to be quickly performed, with the software being more flexible in its operation.

The return or reflected laser signal is received by quadrant detector 28, with signals from each quadrant thereof amplified by respective preamplifiers 66. The amplified signals are each applied to respective analog-to-digital converters 68, which each convert the analog quadrant detector signals to a digital signal. Again, these A/D converters may be clocked at the system rate of about 40 MHz, and may be 8 bits wide.

Figure 6:
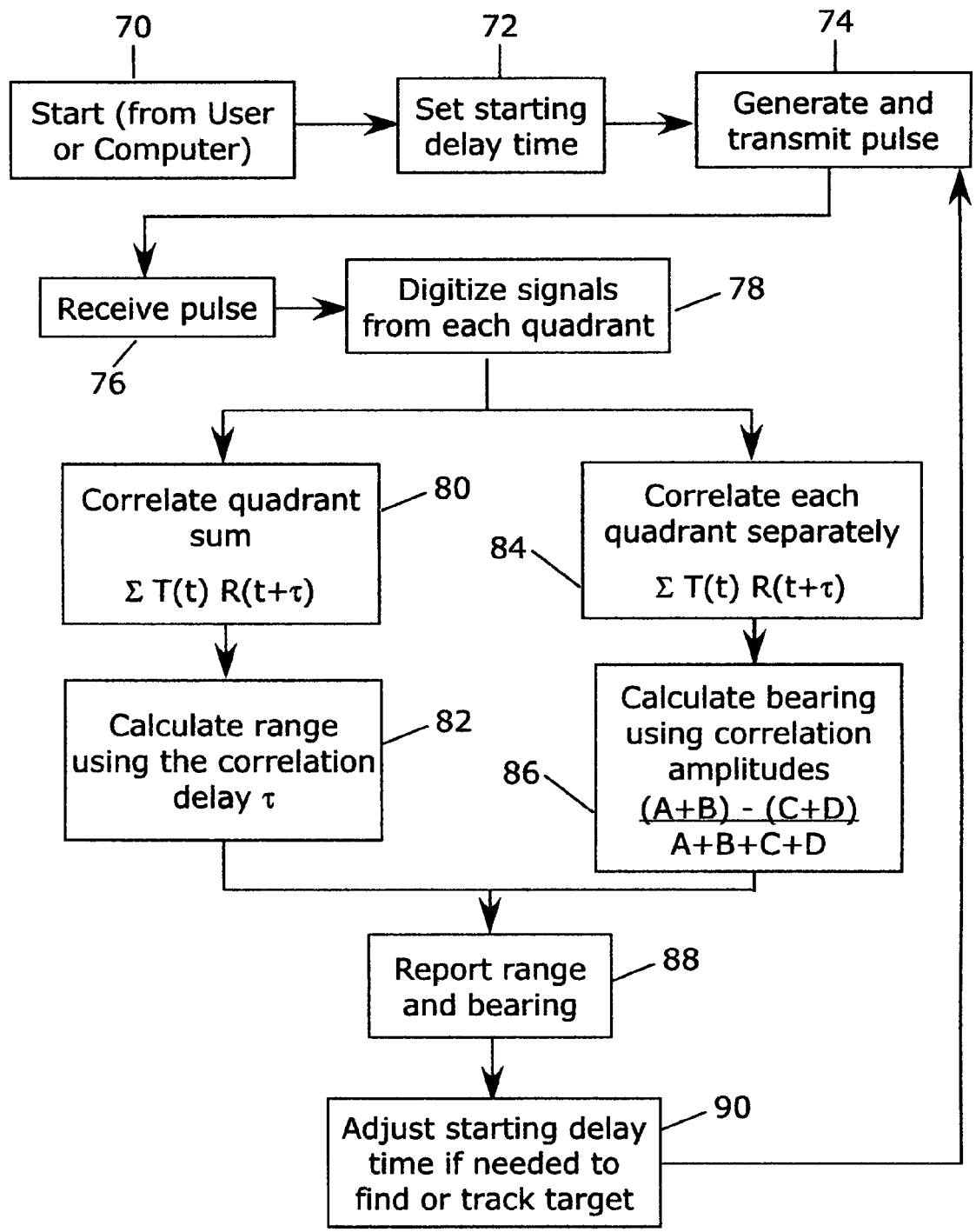
FIG. 6 is a flowchart showing overall operation of software of the present invention.
Figure 7:
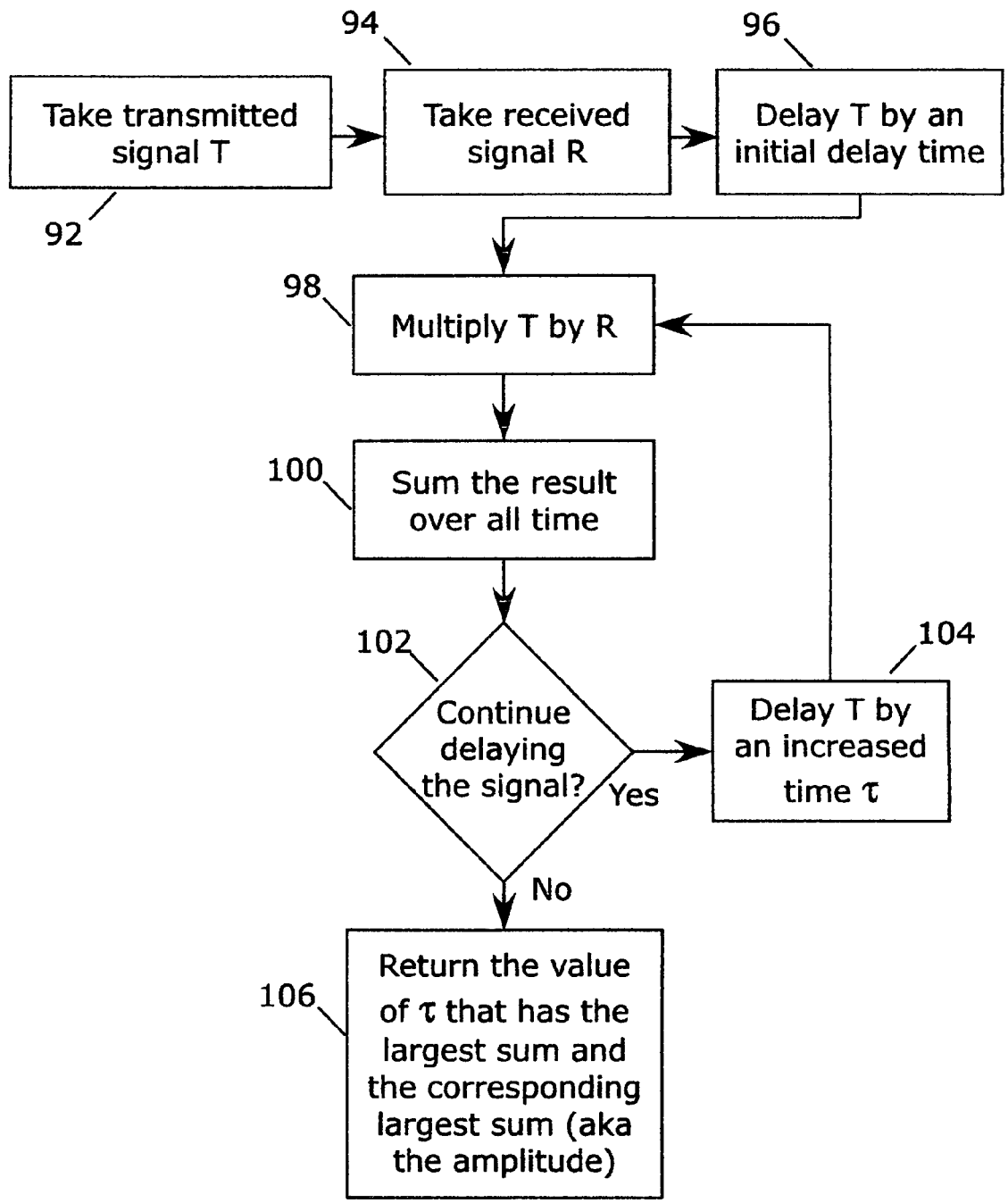
FIG. 7 is a flowchart showing operation of range-finding software of the present invention.
Figure 8:
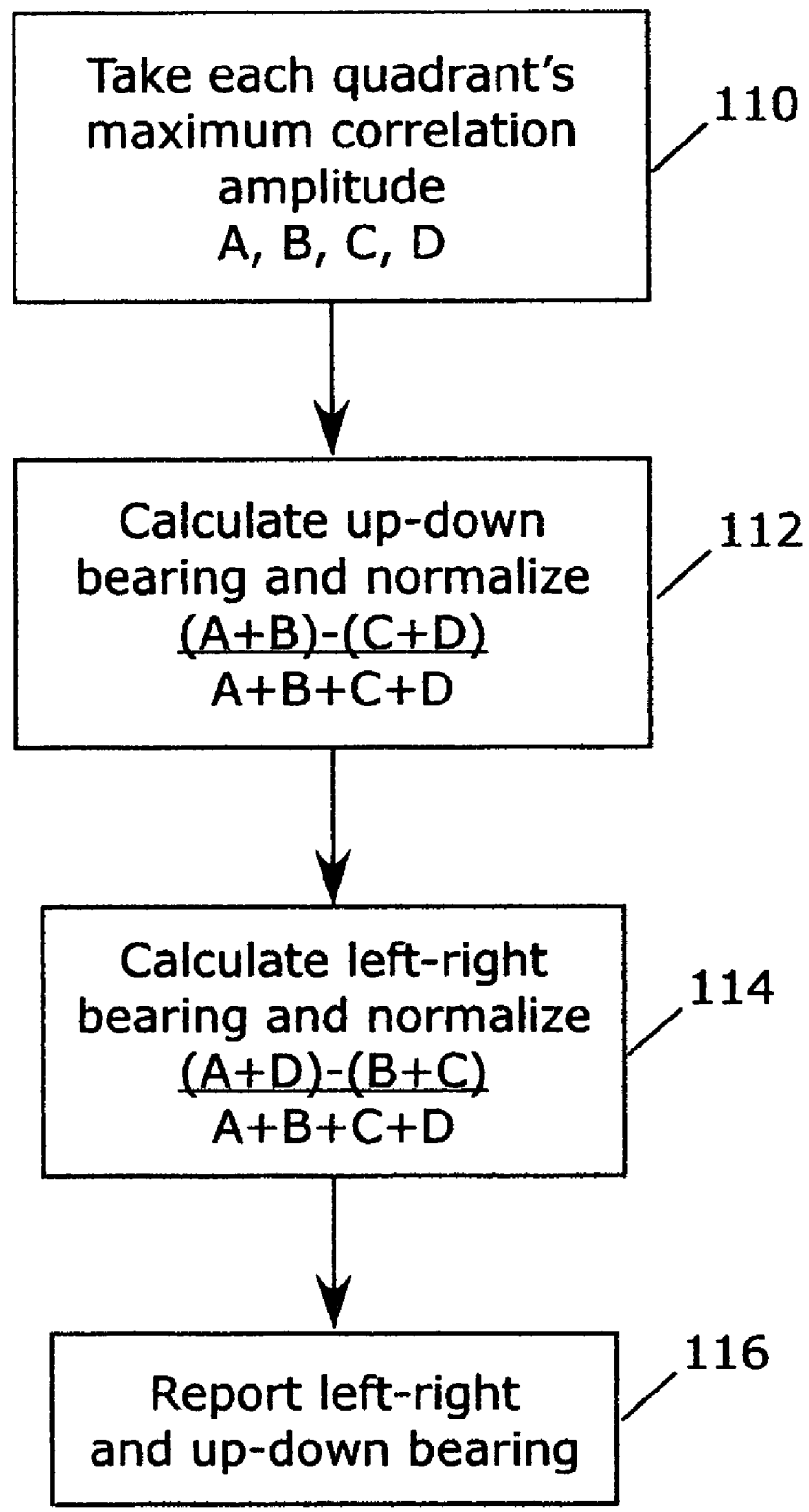
FIG. 8 is a flowchart showing operation of bearing-finding software of the present invention.

Referring now to the flowcharts of FIGS. 6, 7 and 8, an explanation of software/firmware is provided. As noted, programming to implement this software may be programmed, or "burned" into FPGA 64, or may alternately reside in non-volatile memory and called when needed. Such programming may further be entirely located in a non-volatile memory in instances where an FPGA is not used. In applicant's invention, and by way of example, software in the FPGA (firmware) includes all correlation processes, range calculations and bearing calculations. Pulse generation is also performed by firmware in the FPGA. Software not in the FPGA includes communication functions with the RS-232 port and may include other communication functions. In a spacecraft, a system controller may provide initial parameters, such as estimated range and location. In other systems the FPGA may include a sequence for sequentially scanning preselected ranges, or range may be set by communications at the microprocessor based on internal or external data. A high-level flowchart of the software is shown in FIG. 6, where at box 70 the system may be initialized by a user requesting range data, or a computer initializing the software responsive to programming related to an autonomous mission. Such initialization would typically include setting program variables and the like to their initial values, as is known in the art. One of these variables includes setting an initial correlation time delay at box 72, this delay being representative of a range at which the system first begins to scan for range correlations. Such a range may be a highest system range for long-range acquisition, or some other intermediate range, depending on the application. At box 74 a first pulse sequence is generated by pulse sequence generator 30 (FIG. 1) and applied to the actively selected laser diodes for transmission. At box 76 the return reflection which in this embodiment develops an analog signal is received by laser detector 14 (FIG. 1), and at box 78 the pulses are digitized and applied to FPGA 64 for processing. The digitized signals are applied to boxes 80, 82, where at boxes 80, 82 correlation processing to determine range occurs, and at boxes 84, 86 correlation processing to determine bearing occurs. As shown, these occur as 2 parallel processes to increase speed of processing. For determining range, and at box 80, the software sums the signal from each quadrant of quadrant detector 28 (FIG. 5) into one received signal, after which a correlation process occurs between the transmitted pulses and the received signal, as will be further explained. At box 82 the software then converts a time delay associated with a received signal and providing a highest correlation between the transmitted signal and a respective received signal into range by dividing the speed of light by the time delay.

For determining bearing, at box 84 each quadrant's received signal is correlated separately, after which bearing is calculated at box 86 using correlation amplitudes. At box 88 range and bearing are reported, and at box 90 the correlation time delay for range is adjusted to a different value where necessary for finding or tracking a target, and the logic flow loops back to box 74.

In another embodiment of Applicant's invention, range may be calculated from about 500 meters down to about 10 meters or so by simply measuring the time light takes to travel to the target and back, and beyond 500 meters using their correlation process to determine range. This would be a dual-mode system wherein the 2 processes would be called as needed.

The flowchart of FIG. 7 further illustrates the correlation processing of boxes 80, 84 of FIG. 6 to determine range and bearing. Here, the transmitted laser signals as sampled by photodetectors 24 (FIG. 5) are obtained and stored along with a temporal index at box 92, and at box 94 the return laser pulses are received, summed, and stored as described above. The difference in time between transmission of the pulses and reception of the pulses is the time the laser pulses took to travel to the target and back, and forms the basis by which range is calculated. At box 96 at least 1 copy of (or the original) digitized electrical signals representative of the transmitted laser pulses as sampled by photodetectors 24 are temporally delayed by an initially selected time delay, and the temporally delayed signals multiplied by the return pulse sequence at box 98. At box 100 the product of these multiplications are summed together to develop a single number representative of the degree of correlation between the delayed copy of the transmitted signals and received signals. At box 102 the question is asked whether to continue delaying the transmitted signal T, as where a correlation has not been found, and if this is the case the time delay is incremented by another time period and the logic process loops back to box 98. The processes of boxes 98-104 repeat until a best correlation is obtained or the maximum number of delayed copies for a particular laser pulse sequence is reached. At box 106, if a correlation is found, the time period of the largest sum is returned, this time period indicative of the travel time of the laser beam to and from the target.

Figure 9:
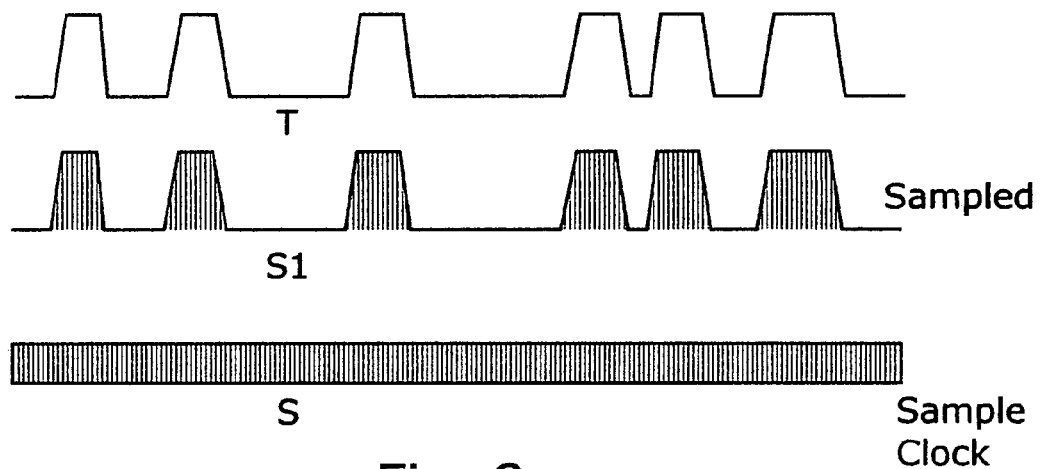
FIG. 9 illustrates a series of waveforms showing samples of transmitted laser light from Applicants invention.
Figure 10:
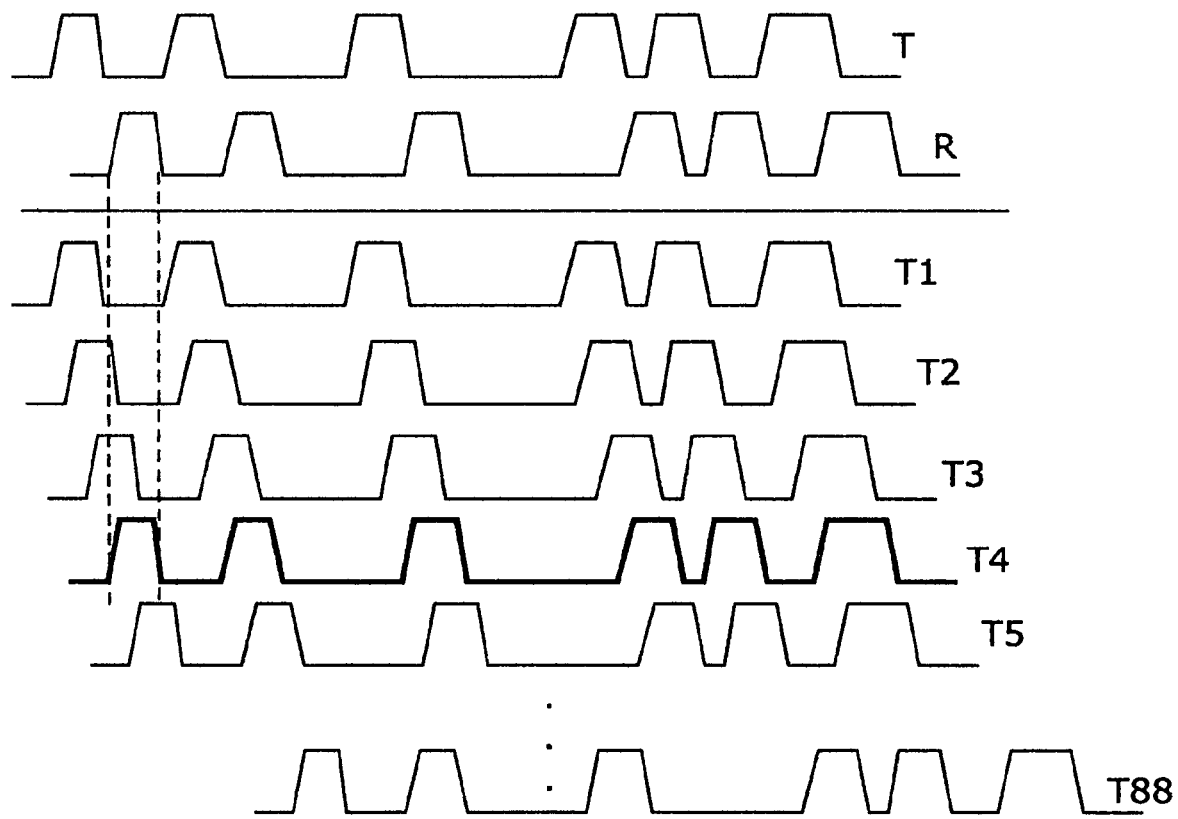
FIG. 10 shows a series of waveforms illustrate operation of Applicants invention.

This process is illustrated in the waveforms of FIGS. 9 and 10 wherein waveform T is the transmitted waveform, and waveform S is the sample clock rate, which as stated runs at about 40 Mhz. Thus, a sampled waveform, as shown in waveform S1, has laser pulses wherein each laser pulse is digitally represented by a large number of clock rate samples. The number of clock rate samples are representative of laser pulse width and amplitude of the pulse sequence, with each clock sample being a digital number between 0 and 255 due to the A/D process being 8 bits wide. Thus, both light intensity profile and duration of each pulse is digitally captured. As there are 30-40 laser pulses in a pulse sequence, and by way of example only, each pulse sequence is sampled at the 40 Mhz clock rate 192,000 times. A digital copy of the transmitted, sampled pulse sequence may be delayed by a maximum time delay corresponding to about 1400 clock rate samples, or 35 microseconds, where a 40 Mhz clock computes to 25 nanoseconds per sample, and wherein light travels about 25 feet during 25 nanoseconds. As such, light travels about 10 km (about 5 km for a round trip to target and back, thus determining maximum range of the system) during the maximum 35 microsecond sample period. It will be noted that the laser emitters are thus switched on and off relatively slowly so as to extend their operational life span.

Referring now to FIG. 10, the received pulse sequence is digitized, and a copy the digital representation thereof provided to each of what may be considered to be 88 channels within FPGA 64. In each channel, the copy of a transmitted pulse sequence of 192,000 clock samples is delayed by a predetermined time delay corresponding to a discrete range, the time delays each corresponding to a distance increment of about 25 feet as noted above. Each delayed copy of a transmitted pulse sequence is then correlated by multiplying the delayed copy by the received pulse sequence, which also consists of 192,000 samples, developing 192,000 products in each of the 88 channels. In each channel, the 192,000 products are summed together, and the channel with the largest sum corresponds to the best correlation between a respective delayed copy of a transmitted signal and the received signal. The time delay associated with the channel having the best correlation is the time delay corresponding to the time the laser beam took to travel to and from the target, this time delay is used to calculate range. In addition, this sum of the products used to obtain the best correlation is also used to compute bearing, as earlier described. The number of "channels" in this instance is determined by hardware constraints within FPGA 64. Here, it is to be noted that there would be a memory register in each channel for storing a pointer indicating where within the set of 1,400 samples a corresponding delay is established. In other words, if the first through the 88$^{th}$ samples are being correlated, the memory registers for the first through the 88$^{th}$ channel would contain pointers that point to samples 1-88 respectively. If a target is not found within this first range of 88 samples, another laser pulse sequence is sent and the registers reset to contain pointers corresponding to samples 89-176. This process is repeated until 16 laser pulse sequences are transmitted, scanning through the entire 5 km range wherein 1400 delays are incrementally applied, 88 at a time to an associated laser pulse sequence. As noted, the delay associated with the highest correlation is indicative of a round trip travel time of the laser light to the target and back, and when divided in half provides range to the target.

FIG. 8 further illustrates the processes of boxes 84, 86 of FIG. 6 wherein bearing is determined. Here, at box 110 the signal from each quadrant is separately correlated and the maximum correlation amplitude saved. At box 112 the vertical component of the bearing is computed by adding the correlation peaks of the upper two quadrants and adding the correlation peaks from the lower 2 quadrants, and subtracts these summed values one from another, and normalizes the result. Similarly, at box 114 the horizontal component of the bearing is calculated by adding the correlation peaks from the left 2 quadrants and adding the correlation peaks from the right 2 quadrants and subtracting them, and normalizing the results. The bearing is then reported at box 116.

Having thus disclosed construction of my invention and the manner of its use, it should be apparent that incidental changes may be made thereto by those skilled in the relevant arts that fairly fall within the scope of the following appended claims, wherein we claim:

1. A method for determining at least range to a target comprising:
   sending a laser beam signal to said target,
   obtaining a replica of a sent said laser beam signal including a temporal index indicating time of transmission of said laser beam signal,
   developing a predetermined number of copies of said replica of said laser beam signal,
   applying a different, predetermined time delay to each copy of said predetermined number of copies, each said time delay corresponding to a discrete different range to a said target,
   receiving a return reflection of said laser beam signal from said target, said return reflection being delayed with respect to said temporal index by travel time to and from said target,
   comparing a received said return reflection of said laser beam signal to each of delayed said predetermined number of copies in order to find a said copy having a highest correlation with said received return reflection,
   using said predetermined time delay associated with a found said copy having a highest correlation with said received return reflection to calculate range to said target.

2. A method as set forth in claim 1 wherein said sending a laser beam signal further comprises diverging said laser beam signal into a cone so that said return reflections are receivable from a said target being within said cone, and configuring said optical receiver to have a field of view generally matching an optical angle of said cone.

3. A method as set forth in claim 2 further comprising increasing reflectivity of said target, for increasing power of said return reflection.

4. A method as set forth in claim 1 wherein said sending a laser beam signal to a target further comprises forming said laser beam into a predetermined pulse train sequence.

5. A method as set forth in claim 4 wherein said forming said laser beam signal into a predetermined pulse train sequence further comprises configuring said pulse train sequence as a pseudo-random code.

6. A method as set forth in claim 1 wherein said obtaining a replica of a sent said laser beam signal further comprises:
   sampling laser light of said laser beam signal with a light sensor as it is transmitted to obtain said replica,
   storing said replica of said laser beam signal.

7. A method as set forth in claim 6 wherein said sampling said laser beam signal further comprises positioning a photodetector to receive a portion of said laser beam signal.

8. A method as set forth in claim 7 wherein said positioning a photodetector to receive a portion of said laser beam signal further comprises positioning said photodetector to receive a specular reflection from a lens through which said laser beam signal passes.

9. A method as set forth in claim 7 wherein said positioning a photodetector to receive a portion of said laser beam signal further comprises positioning said photodetector so as to receive said portion of said laser beam signal from within a lens through which said laser beam signal passes, as by incorporating said photodetector in said lens or mounting said photodetector directly to said lens.

10. A method as set forth in claim 2 further comprising using said optical receiver to focus said return reflection onto a photodetector, for providing range information about said target.

11. A method as set forth in claim 10 further comprising using said optical receiver to focus said return reflection onto a quadrant photodetector, for providing bearing information about said target in addition to said range information about said target.

12. A method as set forth in claim 11 further comprising using said range information and said bearing information to simultaneously calculate range and bearing of said target.

13. A method as set forth in claim 6 wherein said applying a different, predetermined time delay to each said copy of said predetermined number of copies further comprises sequentially applying a said time delay to each said copy wherein each said time delay differs by about 25 nanoseconds.

14. A method as set forth in claim 13 further comprising simultaneously correlating all delayed said copies with a said return reflection of a said laser beam signal from which said copies are obtained.

15. A method as set forth in claim 14 wherein if a correlation between said return reflection and a one of said predetermined number of delayed copies of said replica is not found, then transmitting another said laser beam signal and sequentially delaying another set of said predetermined number of copies of a said replica of said another laser beam signal beginning with a next said time delay from an ending said time delay associated with said copy of the prior-transmitted said laser beam signal.

16. A method as set forth in claim 15 further comprising transmitting a sufficient number of independent, discrete laser beam signals and developing a corresponding number of sequentially delayed sets of said predetermined number of copies wherein each said set differs from a preceding set and a following set by said about 25 nanosecond time delay so as to provide a maximum range of about 5 kilometers.

17. A method for determining at least range to a target comprising:
sending a laser beam signal to said target,
obtaining a replica of a sent said laser beam signal including a temporal index indicating time of transmission of said laser beam signal,
developing a predetermined number of copies of said replica of said laser beam signal,
applying a different, predetermined time delay to each copy of said predetermined number of copies, each said time delay corresponding to a discrete different range to a said target,
receiving a return reflection of said laser beam signal from said target, said return reflection being delayed with respect to said temporal index by travel time to and from said target,
comparing a received said return reflection of said laser beam signal to each of delayed said predetermined number of copies in order to find a said copy having a highest correlation with said received return reflection,
using said predetermined time delay associated with a found said copy having a highest correlation with said received return reflection to calculate range to said target.

18. A method as set forth in claim 17 wherein said obtaining a replica of said laser beam signal further comprises sampling laser light of said laser beam signal with a light sensor.

19. A method as set forth in claim 18 wherein said sending a laser beam signal further comprises diverging said laser beam signal into a cone so as to increase an angular field of said laser beam signal, and wherein said receiving a return reflection further comprises configuring an optical receiver to have a field of view generally matching said angular field.

20. A method as set forth in claim 19 further comprising using said optical receiver to focus said received return reflection on a quadrant detector, for determining bearing of said target.

21. A method as set forth in claim 20 wherein said applying a different, predetermined time delay to each copy further comprises sequentially differing each said copy by about 25 nanoseconds.

22. A method as set forth in claim 21 wherein if a correlation is not found between said return reflection and a one of said predetermined number of delayed copies, then transmitting another said laser beam signal and sequentially delaying another set of said predetermined number of copies of a said replica of said another laser beam signal beginning with a next said time delay from an ending said time delay associated with a said copy of the prior-transmitted said laser beam signal.

23. A method as set forth in claim 22 further comprising transmitting a sufficient number of independent, discrete laser beam signals and developing a corresponding number of sequentially delayed sets of said predetermined number of copies wherein each said set differs from a preceding set and a following set by said about 25 nanosecond time delay so as to provide a range of about 5 kilometers.

* * * * *